United States Patent [19]

Joye et al.

[11] Patent Number: 5,916,860
[45] Date of Patent: Jun. 29, 1999

[54] CLEANING AND/OR STRIPPING COMPOSITION, BASED ON A DIBASIC ACID ESTER AND AN ETHER

[75] Inventors: Jean-Luc Joye, Paris; Marle-Madeleine Vincent, Athis-Mons, both of France

[73] Assignee: Rhone-Poulenc Chimie, Courbevoie, France

[21] Appl. No.: 08/913,802

[22] PCT Filed: Mar. 22, 1996

[86] PCT No.: PCT/FR96/00434

§ 371 Date: Sep. 22, 1997

§ 102(e) Date: Sep. 22, 1997

[87] PCT Pub. No.: WO96/30453

PCT Pub. Date: Oct. 3, 1996

[30] Foreign Application Priority Data

Mar. 24, 1995 [FR] France ................... 95 03467

[51] Int. Cl.$^6$ ................ C11D 01/72; C11D 3/44
[52] U.S. Cl. ............ 510/201; 510/212; 510/202; 510/203; 510/213; 510/505; 510/506; 510/500
[58] Field of Search .............. 510/212, 201, 510/202, 203, 206, 213, 505, 506, 500

[56] References Cited

U.S. PATENT DOCUMENTS

| 4,673,524 | 6/1987 | Dean | 252/118 |
| 4,749,510 | 6/1988 | Nelson | 252/166 |
| 4,780,235 | 10/1988 | Jackson | 252/170 |
| 4,927,556 | 5/1990 | Pokorny | 252/173 |
| 5,030,290 | 7/1991 | Davis | 134/4 |
| 5,360,489 | 11/1994 | Gaul et al. | 134/42 |
| 5,413,729 | 5/1995 | Gaul | 252/162 |

FOREIGN PATENT DOCUMENTS 3438399 3/1986 Germany.

*Primary Examiner*—Yogendra N. Gupta
*Assistant Examiner*—Gregory E. Webb
*Attorney, Agent, or Firm*—Andrew M. Solomon; Jean-Louis Seugnet

[57] ABSTRACT

A stripping and/or cleaning composition is disclosed, which contains, by volume: (a) 1 to 90% of at least one $C_1$–$C_4$ dialkyl ester of at least one $C_4$–$C_6$ aliphatic diacid; and (b) 99 to 1% of at least one ether selected from the group consisting of ethers with a flash point above 5° C., at least one methoxy group per molecule and a molecular weight of less than 200.

11 Claims, No Drawings

CLEANING AND/OR STRIPPING COMPOSITION, BASED ON A DIBASIC ACID ESTER AND AN ETHER

This application is a 371 of PCT/FR/96/00434 submitted on Mar. 22, 1996.

The present invention concerns a composition which can both strip coatings, for example paint based coatings, and clean objects which have been soiled by oils or greases.

The first stripping or cleaning compositions of the above type were based on methylene chloride and/or 1,1,1-trichloroethane (1.1.1.T) (see, for example, United States patent U.S. Pat. No. 2,507,983 and German patent DE-A-2 524 752).

Compositions of that type have the advantage of being highly effective and cheap. However, those compositions may cause environmental damage, more particularly to the ozone layer (Montreal protocol which terminates the use of 1.1.1.T, normally at the end of 1995).

Considerable advances were made by replacing chlorinated solvents by either lactames or lactones, usually N-methyl-2-pyrrolidone or gamma-butyrolactone (U.S. Pat. No. 4,120,810), or by a mixture of an alkyl diester of a dibasic acid which is an industrial by-product of the production of monomers required for the preparation of polyamides (DE-A-3 438 399).

The above compositions are not always suitable for stripping coatings of different natures such as water-based paints, oil-based paints, lacquers, varnishes and plastic resins. In particular, they are not effective for stripping coatings and for cleaning various objects to remove oils and greases.

The aim of the present invention is to provide a composition which is effective both for stripping and for cleaning.

A further aim of the invention is to provide a composition of the above type which in a variation, is free of solvents.

A still further aim is to provide a. composition of the above type which is stable for at least one year when stored.

These and other aims are achieved by the present invention which concerns a stripping and/or cleaning composition comprising, by volume:
a) 1% to 90% of at least one $C_1$–$C_4$ dialkyl ester of at least one $C_4$–$C_6$ aliphatic dibasic acid;
b) 99% to 1% of at least one ether selected from ethers having:
   a flash point of more than 5° C.;
   at least one methoxy group per molecule;
   a molar mass of less than 200.

The composition of the invention thus contains at least 1% to 90% to 1% by volume, preferably 10% to 80%, of a $C_1$–$C_4$ dialkyl ester of at least one $C_4$–$C_6$ aliphatic dibasic acid.

The esters in the dibasic acid ester mixture are derived mainly from adipic, glutaric and succinic acids. In particular, the alkyl groups of the ester portion are selected from methyl and ethyl groups, but may also be propyl, isopropyl, butyl, n-butyl or isobutyl.

As indicated above, the $C_4$ to $C_6$ dibasic acids are by-products of the preparation of adipic acid which is a one of the principal monomers in polyamides, and the dialkyl esters are obtained by esterification of this by-product which generally contains 15% to 30% by weight of succinic acid, 50% to 75% of glutaric acid and 5% to 25% of adipic acid.

Dibasic acid esters are products which are commercially available. Particular examples of are Rhodiasolv RPDE® sold by Rhône-Poulenc and "Du Pont Dibasic Esterse®" sold by Du Pont de Nemours.

The composition of the invention also contains 99% to 1% by volume, preferably 90% to 20% by weight, of at least one ether selected from ethers havinz:
a flash point of more than 5° C.;
at least one methoxy group per molecule;
a molar mass of less than 200.

Examples of ethers for use in compositions of the invention are:
1-ter-butoxy-2-methoxyethane, anisole;
1,4-dimethoxybenzene; ethyleneglycol dimethylether;
1,2-dimethoxybenzene;
2-methoxy-1,3-dioxolane; diethyleneglycol dimethylether;
1,2,3-trimethoxybenzene;
1,3-dimethoxybenzene.

The compositions of the invention may also contain at least one of the products below:
c) At least one aliphatic or aromatic, colourless liquid hydrocarbon solvent with a flash point of more than 40° C., preferably more than 70° C., such that the solvent is not classified as a flammable solvent.

Particular examples of solvents which are petroleum derivatives with a high flash point are mineral spirits such as petroleum spirit and naphthas.

Examples of commercially available products which can be used in compositions of the invention are Isopar® from Exxon, Soltrol® from Shell and HiSol® solvents from Ashland. It is recommended that 10 to 100 volumes, preferably 30 to 60 volumes, of c) is used per 100 volumes of a)+b).

Other possibilities are compounds with an aliphatic hydrocarbon chain which is saturated or contains at least one unsaturation, substituted by at least one alkyl, aryl or alkylaryl radical. More particularly, the aliphatic chain contains 3 to 12 carbon atoms, preferably 4 to 10 carbon atoms, these values being based on the longest hydrocarbon chain in the molecule, disregarding the substituents. In a variation, the aliphatic hydrocarbon chain is substituted with two aryl and/or alkylaryl groups.

More particularly, the aryl radical contains 6 carbon atoms, and the alkylaryl radical is an aromatic nucleus substituted with at least one alkyl group, preferably $C_1$–$C_4$. In this case, the bond between the alkylaryl substituent and the aliphatic hydrocarbon chains in the compound can occur via one of the carbon atoms in the alkyl portion of the compound. Preferably, though, the bond is directly to one of the carbon atoms of the aromatic nucleus.

As indicated above, the aliphatic hydrocarbon chain of the compound may also contain at least one alkyl radical, in particular an alkyl radical containing 1 to 4 carbon atoms, the methyl group being preferred.

Examples of compounds of this type are 2,4-diphenyl-2-methyl pent-3-ene and 2,4-diphenyl-2-methyl pentane, these compounds being used alone or as a mixture.
d) At least one non-ionic surfactant, preferably selected from ethoxylated or ethoxy-propoxylated alkylphenols and ethoxylated or ethoxy-propoxylated fatty alcohols, in a proportion which may, for example, be in the range 0.1% to 10%, preferably in the range 0.5% to 5% by weight, with respect to the total composition weight.

These surfactants facilitate rinsing with water of the compositions on the substrate to be stripped or cleaned and, in some cases, accelerate the stripping and/or cleaning action.

Other surfactants which can be used are:
ethoxylated or ethoxy-propoxylated triglycerides;
ethoxylated or ethoxy-propoxylated fatty acids;
ethoxylated or ethoxy-propoxylated esters of sorbitan;

ethoxylated or ethoxy-propoxylated fatty amines;

ethoxylated or ethoxy-propoxylated di(1-phenylethyl) phenols;

ethoxylated or ethoxy-propoxylated tri(1-phenylethyl) phenols.

The number of oxyethylene (OE) and/or oxypropylene (OP) units in these non-ionic surfactants is normally between 2 and 100 depending on the desired HLB (hydrophilic/lipophilic balance).

The number of OE and/or OP units is preferably between 2 and 50.

The ethoxylated or ethoxy-propoxylated fatty alcohols generally contain 6 to 22 carbon atoms, the OE and OP units being excluded from these numbers, and are preferably ethoxylated.

The ethoxylated or ethoxy-propoxylated triglycerides may be triglycerides of vegetable or animal origin (such as lard, suet, peanut oil, butter fat, cottonseed oil, linseed oil, olive oil, palm oil, grapeseed oil, fish oil, soya oil, castor oil, rapeseed oil, copra oil, coconut oil), and are preferably ethoxylated.

The ethoxylated or ethoxy-propoxylated fatty acids are esters of fatty acids (such as oleic acid or stearic acid), and are preferably ethoxylated.

The ethoxylated or ethoxy-propoxylated esters of sorbitan are esters of sorbitol cyclised with $C_{10}$ to $C_{20}$ fatty acids such as lauric acid, stearic acid or oleic acid, and are preferably ethoxylated.

The term "ethoxylated triglyceride" as used in the present invention means both the products obtained by ethoxylation of a triglyceride with ethylene oxide and those obtained by transesterifcation of a triglyceride by a polyethyleneglycol.

Similarly, the term "ethoxylated fatty acid" includes both the products obtained by ethoxylation of a fatty acid with ethylene oxide and those obtained by esterification of a fatty acid by a polyethyleneglycol.

The ethoxylated or ethoxy-propoxylated fatty amines generally contain 10 to 22 carbon atoms, the OE and OP units being excluded from these numbers, and they are preferably ethoxylated.

The ethoxylated or ethoxy-propoxylated alkylphenols generally contain 1 or 2 linear or branched alkyl groups containing 4 to 12 carbon atoms, in particular octyl, nonyl or dodecyl.

Examples of non-ionic surfactants from the group formed by ethoxylated or ethoxy-propoxylated alkylphenols, ethoxylated di(1-phenylethyl)phenols and ethoxylated or ethoxy-propoxylated tri(1-phenylethyl)phenols are:

di(1-phenylethyl)phenol ethoxylated with 5 OE units;

di(1-phenylethyl)phenol ethoxylated with 10 OE units;

tri(1-phenylethyl)phenol ethoxylated with 16 OE units;

tri(1-phenylethyl)phenol ethoxylated with 20 OE units:

tri(1-phenylethyl)phenol ethoxylated with 25 OE units:

tri(1-phenylethyl)phenol ethoxylated with 40 OE units;

tri(1-phenylethyl)phenols ethoxypropoxylated with 25 OE+OP units;

nonylphenol ethoxylated with 2 OE units;

nonylphenol ethoxylated with 4 OE units;

nonylphenol ethoxylated with 9 OE units;

nonyiphenols ethoxypropoxylated with 25 OE+OP units;

nonylphenols ethoxypropoxylated with 30 OE+OP units;

nonylphenols ethoxypropoxylated with 40 OE+OP units;

nonylphenols ethoxypropoxylated with 55 OE+OP units;

nonylphenols ethoxypropoxylated with 80 OE+OP units.

e) At least one thickening agent, preferably used in a concentration in the range 0.5% to 10% by weight with respect to the total composition weight, preferably in the range 1% to 3%.

Conventional thickening agents can be used, such as cellulose derivatives (ethylcellulose, hydroxypropylcellulose), xanthane, guar or carob gums, alginates, polyacrylates, starches, modified starches and modified clays.

f) At least one polar aprotic solvent, for example a lactame or lactame such as N-methyl-2-pyrrolidone or gamma-butyrolactone, alkyleneglycolethers, acetonitrile, dimethylformamide, dimethylsulfoxide and N-methylmorpholine.

As an example, 10% to 40% by volume of co-solvent with respect to the total composition volume can be used.

g) Abrasive particles selected from aluminium oxide, silica, silicon carbide, tungsten carbide and silicon carbonitride.

The compositions of the invention can be used to clean oils and greases and to strip paint and plastic resins.

The substrates to be cleaned can be of many different types.

The most usual are wood, metals and their alloys such as steel, stainless steel, aluminium, copper, plastic materials and inorganic glasses.

In accordance with the present invention, the cleaning and/or stripping method is as follows:

a) Bringing the object to be cleaned into contact with the formulation of the present invention by immersing (with or without stirring) or spraying. The contact temperature is in the range 5° C. to 50° C. The contact time is in the range 1 min to 60 min.

For degreasing, the composition of the present invention totally or partially dissolves the oils to be eliminated.

For stripping, the composition of the present invention lifts the resins to be eliminated.

b) Rinsing the cleaning formulation of the invention with water.

The cleaning and stripping action of the present invention is illustrated in the following examples:

A) Degreasing of a paraffin oil: "Total 200 Neutral®"

The degreasing composition was as follows (% by volume):

34.33% of RPDE:

34.33% of anisole;

29.33% of Petroleum Spirit;

1% of nonylphenol 9 OE

1% of nonylphenol 12 OE.

This formulation could dissolve up to 30% by weight of Total 200 Neutral oil at ambient temperature.

The substrate was a steel plate (type R Q-panel) which had been cleaned. It was greased by immersing the plate in the oil for 2 minutes then storing it for 6 hours.

The greased plate was then immersed in the cleaning composition described above for a time $t_n$, at ambient temperature.

The plate was rinsed in a stream of running water for 5 to 10 seconds on each face (flow rate: 2 l/min, temperature 17° C.). The cleanliness of the plate was determined using a water break test (ASTM F22-65, 1992).

The immersion time $t_n$ required to completely clean the steel plate, which had been greased with Total 200 Neutral oil using the above cleaning composition, was 15 seconds.

The above method was repeated except that in place of composition C1, composition C2 was used which had the following composition:

68% of RPDE;

30% of Solvexo 200 (a hydrocarbon cut sold by Exxon, with a flash point of

98° C.);

1% of nonylphenol 9 OE

1% of nonylphenol 12 OE.

The required immersion time for this composition was 30 seconds. The absence of anisole meant that it was not within the scope of the invention and was 2 times less effective.

B) Stripping plastic resins from a glass support

Glass disks were soiled with cross-linked plastic resins. These plastic resins were diethylene glycol bis allyl carbonate and bisphenol A bis allyl carbonate type polycarbonates.

The stripping composition was as follows:

70% RPDE;

30% anisole.

The glass supports, soiled with the two resins, were immersed in the above composition at 50° C. without stirring. After 30 minutes, the two cross-linked resins had been completely lifted from the glass supports.

What is claimed is:

1. A stripping or cleaning composition comprising by volume:
 a) 1% to 90% of one or more $C_1$–$C_4$ dialkyl esters of at least one $C_4$–$C_6$ aliphatic dibasic acid; and
 b) 99% to 1% of one or more ethers having:
  a flash point of more than 5° C.;
  at least one methoxy group per molecule;
  a molar mass of less than 200; and
  wherein the ether b) is selected from the group consisting of:
  1-ter-butoxy-2-methoxyethane anisole;
  1,4-dimethoxybenzene;
  ethyleneglycol dimethylether;
  1,2-dimethoxybenzene;
  2-methoxy-1,3-dioxolane;
  diethyleneglycol dimethyether;
  1,2,3-trimethoxybenzene; and
  1,3-dimethoxybenzene.

2. A stripping or cleaning composition comprising by volume:
 a) 1% to 90% of one or more $C_1$–$C_4$ dialkkyl esters of at least one $C_4$–$C_6$ aliphatic dibasic acid; and
 b) 99% to 1 % of one or more ethers having;
  a flash point of more than 5° C.
  at least one methoxy group per molecule;
  a molar mass of less than 200; and
 c) one or more aliphatic or aromatic, colorless liquid hydrocarbon solvents with a flash point of more than 70° C.

3. A composition according to claim 2, comprising 10 to 100 volumes of c) per 100 volumes of a)+b).

4. A composition according to claim 3, comprising 30 to 60 volumes of c) per 100 volumes of a)+b).

5. A composition according to claim 2, further comprising:
 d) at least one non-ionic surfactant present in an amount of 0.1% to 10% by weight of the total composition.

6. A composition according to claim 5, wherein the surfactant is an ethoxylated alkylphenol, an ethoxy-propoxylated alkylphenol, an ethoxylated fatty alcohol or an ethoxy-propoxylated fatty alcohol.

7. A composition according to claim 5, further comprising:
 e) 0.5% to 10% by weight of the total composition of a thickening agent.

8. A composition according to claim 7, further comprising:
 f) a polar aprotic co-solvent.

9. A composition according to claim 8, wherein the co-solvent is selected from the group consisting of N-methyl-2-pyrrolidone, gamma-butyrolactone, alkyleneglycol ethers, acetonitrile, dimethylformamide, dimethylsulfoxide, and N-methylmorpholine.

10. A composition according to claim 8, further comprising:
 g) abrasive particles.

11. A composition according to claim 1, comprising by volume:
 a) 10% to 80% of one or more $C_1$–$C_4$ dialkyl esters; and
 b) 20% to 90% of one or more ethers.

* * * * *